2,897,233

PROCESS FOR THE SEPARATION OF AMINO ACIDS

Emil Kaiser, Chicago, Ill., assignor to Armour and Company, Chicago, Ill., a corporation of Illinois No Drawing. Application February 6, 1956
Serial No. 563,454

3 Claims. (Cl. 260—534)

This invention relates to a process for the preparation of isocyanato acid esters. More particularly, the invention relates to a method for utilizing phosgene in converting amino acids to isocyanato acid esters.

The isocyanates of amino acid esters, also called isocyanato acid esters, are very versatile chemicals. They can be reacted with ammonia to produce substituted hydantoic acid esters. The isocyanato acid esters may be converted to hydantoins, or to substituted urethanes, and in general are useful for any of the applications where diisocyanates are ordinarily employed.

It is an object of the present invention to provide a convenient method for producing isocyanato acid esters, which method is effective not only with pure amino acids as the starting materials but also with mixtures of amino acids such as obtained from the complete hydrolysis of proteins. It is another object of the invention to provide a simple two-step process which enables the production of isocyanates from amino acids in extremely high yields. Other objects and advantages of the invention will appear as the specification proceeds.

The process of the present invention comprises contacting phosgene with an amino acid ester containing a free basic amino group. It is believed that the reaction involves the formation of an intermediate carbamyl chloride derivative of the amino acid ester which in turn, upon removal of hydrochloride gas, provides the desired isocyanato acid ester as the end product.

It is regarded as an important element of the invention that the amino acid ester starting material be employed in the form of the free amine rather than in the form of the amino hydrochloride or other salt. It has been the general experience of workers in the field of organic chemistry that the preparation of isocyanates by reaction of aliphatic primary amines with phosgene is a rather difficult, impractical process, unless the aliphatic primary amine is used in the form of the amine hydrochloride. It has been the experience that when the free amine is used, rather than the hydrochloride, undesirable side reactions and decompositions of the products take place, thus detracting substantially from the yield of isocyanates or, in many cases, preventing completion of the reaction altogether. One of the surprising features upon which the present invention is based was the discovery that when the amine starting material is an amino acid ester containing an esterified carboxyl group in addition to the amino group, the reaction with phosgene to produce isocyanates proceeds quite readily and with extremely high yields when the starting material is used in the free amine form; and, moreover, in cases where mixtures of amino acid esters as obtained from protein hydrolysates are used as the starting material, it is not possible to effect the desired reaction with phosgene unless the free amine form of the amino acid ester is used.

The amino acid substituent of the amino acid ester starting material may be any of the known amino acids, either from natural or synthetic sources. Thus, for example, the amino acid substituent may be either the monoamino-monocarboxylic acid type, such as glycine, alanine, norvaline, leucine, norleucine, isoleucine, isovaline, phenylalanine, tyrosine, serine, α-amino-β-hydroxybutyric acid, cysteine, methionine, and thyroxine; or the monoamine-polycarboxylic acid type, such as aspartic acid, glutamic acid, and the like; or the polyamino-monocarboxylic acid type, such as arginine, lycine, ornithine, asparagine, citrulline, and the like; or the heterocyclic amino acid type, such as histidine, tryptophane. The amino acid constituent of the starting material of the present invention may also be described as including the alpha-, beta-, gamma-, and delta-amino acids. The starting material may further include not only the esters of the individual amino acids but also the esters of amino acid mixtures, such as for example the mixtures obtained by the complete hydrolysis of various proteins and peptides or polypeptides.

The amino acid ester starting materials of the present invention include, as the ester radical, any suitable hydrocarbon or substituted hydrocarbon radical which does not contain a substituent group reactive with phosgene. Such ester radicals include aliphatic, aromatic, cyclic, and heterocyclic radicals, specific examples of which may be given as follows: ethyl, methyl, butyl, cyclohexyl, benzyl, phenyl, octadecyl, cyclopentyl, tetrahydrofurfuryl, and the like. The above lists of specific amino acids and ester radicals are given by way of example of the various types which may be included in the amino acid ester starting material and are not intended as complete lists.

The process of the present invention comprises contacting any one or any mixture of the above defined amino acid esters with phosgene to obtain the isocyanates of said amino acid esters as the end products. The reaction may be carried out merely by contacting the phosgene and the amino acid esters, provided of course that the temperature and other conditions are such that the reactants are in liquid phase. Since the boiling point of phosgene is in the neighborhood of 8° C., the reaction involving the contacting of the two reactants alone is best carried out at temperatures below this point.

In a preferred embodiment of the invention, however, the reaction is carried out in the presence of a mutual solvent which is inert to both the amino acid ester and the phosgene. The use of a solvent in which both the ester and the phosgene are soluble allows the reaction to be carried out at somewhat higher temperatures and with a considerably lesser degree of control over the conditions of the reaction. For the purpose of this reaction, the mutual solvent may be any of the known solvents inert to the reactants, such as for example toluene, benzene, carbon tetrachloride, chloroform, and the like. For reasons which will appear later in this specification, it is preferred, although not essential, that the mutual solvent have a boiling point lower than any of the isocyanate end products to be produced in the reaction.

In a preferred embodiment of the invention, the reaction between the amino acid ester and the phosgene is carried out as a two-step process, involving a preliminary reaction to provide a mixture containing both the isocyanate end products and intermediates, followed by a second stage reaction to convert substantially all the reactants and intermediates to the desired isocyanate end product. By control of the conditions of reaction during the first stage of the procedure, it has been found that a preliminary reaction can be obtained resulting in a mixture of the carbamyl chloride derivative of the amino acid ester, together with some of the desired isocyanato acid ester end product. The subsequent stage of the process then involves treatment to remove hydrochloride gas from the mixture, thus converting the intermediate carbamyl chloride derivative to the desired isocyanato acid ester end product. It has been found that carrying out the reaction in two stages, as just described, eliminates the tendency for formation of polymers and provides an easily controlled method which proceeds smoothly and efficiently to completion.

One suitable way of carrying out the above two-stage process comprises first contacting phosgene and the amino acid ester in a mutual solvent at a relatively low temperature to produce the mixture of intermediates and end products referred to above. An important feature to be taken into consideration during this stage of the procedure is the careful control of temperatures at a relatively low level to promote the formation of the intermediate carbamyl chloride derivatives and inhibit the formation of polymers. During this stage, it is best to maintain the temperature below the boiling point of the mutual solvent. In any event, it is preferred to use temperatures below about 20° C., and temperatures of about 0 to 10° C. has been found very effective at this point. The second stage of the procedure then involves treatment to remove hydrochloride gas from the mixture, thus promoting conversion of the intermediate carbamyl chloride derivative to the desired isocyanato acid ester end product. One suitable way of achieving this involves raising the temperature of the mixture to reflux temperatures and continuing with the refluxing of the solution until the hydrochloride gas had been driven off.

Following the reaction of the amino acid ester with the phosgene to produce the isocyanato acid ester, it is usually desired to remove the isocyanates from the mutual solvent, and this may be achieved in any suitable manner. One especially effective method of accomplishing the separation involves distillation of the various components, and for this purpose it has been found advantageous, in selecting the mutual solvent in which the phosgene reaction is to be carried out, to employ a solvent which has a boiling point lower than the isocyanate end product from which the solvent is to be separated.

Following separation of the solvent from the isocyanate by distillation, it is possible, in cases where a mixture of amino acid esters has been used as the starting material, to carry the distillation out further on a fractionation basis to effect separation of the various isocyanato acid esters one from the other on the basis of boiling point. Thus it is a feature of the present invention that a mixture of amino acids may be fractionated by a process involving (1) converting the mixture of amino acids to the amino acid esters; (2) reacting the amino acid ester mixture with phosgene according to the process of the present invention to provide a mixture of isocyanato acid esters having marked differences in boiling points among the various components; (3) fractionally distilling to obtain the individual isocyanates; and (4) if desired, converting the individual isocyanates back to the individual amino acids, which can readily be done by hydrolyzing the isocyanates by treatment, for example, with hydrochloric acid.

The following specific examples will further serve to illustrate the practice of the invention:

EXAMPLE 1

A mixture of 43 gms. of free amino acid esters, obtained by esterifying an amino acid mixture containing leucine, isoleucine, lysine, and glutamic acid, was dissolved in 200 ml. of dry benzene. This benzene solution was added to a solution containing 60 gms. of phosgene dissolved in 200 mls. of benzene. The mixture was refluxed for 1½ hours, the benzene distilled off in vacuum, and the residue collected. The residue constituted a total of 38 gms. of α-isocyanato acid esters

EXAMPLE 2 a. Preparation of amino acid esters 400 gms. of an amino acid hydrolyzate containing 40% of amino acids, mainly leucine, isoleucine, lysine, and glutamic acid were reacted with anhydrous 3-A alcohol by known methods to obtain a mixture of free amino acid esters. The esters were dissolved in 400 mls. of dehydrated toluene.

b. Preparation of a solution of phosgene in toluene

Dry toluene was placed in a 3-necked flask. The flask was equipped with a gas delivery tube, reaching almost to the bottom of the flask, a tube for removal of gas connected through rubber tubing with the upper vent of a hood and a separatory funnel. Both tubes were equipped with stopcocks.

The flask together with the two tubes, the separatory funnel, and the amino acid ester-containing toluene solution was weighed. Then the flask was placed in a well-ventilated hood and cooled with ice water. After the toluene solution was cooled below 10° C., the flask was attached to the gas delivery tube to a safety flask, which in turn was connected with the upper vent of the hood, the stopcocks of both tubes were opened, only the stopcock of the separatory funnel being kept closed. Then phosgene was passed into the cooled toluene solution. After 40 to 50 minutes, the stream of phosgene was stopped, all stopcocks of the reaction flask were closed, and the flask removed from the cooling bath. The rubber tubings were disconnected, and the flask dried and weighed.

c. Preparation of a mixture of isocyanato acid esters

After weighing, the flask containing the phosgene-toluene solution was placed again in the cooling bath in the hood, the stopcock of the gas delivery tube kept closed, and the stopcock of the other tube opened. Then the toluene solution, containing the amino acid esters obtained from 200 gms. of the amino acid mixture, was poured into the separatory funnel. It was then added to the phosgene solution within 15 to 20 minutes. The stopcock of the separatory funnel was closed, and the mixture kept at room temperature over night.

The next morning, the separatory funnel was quickly exchanged for a reflux condenser. The top of the condenser was connected to the upper vent of te hood, and the two other necks of the flask closed. The flask was heated to reflux in a heating mantle. After 1¾ hours of reflux, the flask was cooled to room temperature and the reflux condenser exchanged for a condenser set for distillation. A receiver was attached to the condenser, and the receiver connected to a safety flask which contained 10% sodium hydroxide solution (to absorb phosgene left in the reaction mixture). A water aspirator vacuum was applied and the toluene distilled in vacuo. The Variac of the heating mantle was set to low voltage to avoid over-heating of the contents of the flask (about 35 volts). The vapor temperature was 25–27° C. After most of the toluene distilled off, the contents of the flask were transferred to a 250 ml. flask. The solvent in the 250 ml. flask was distilled off in vacuo with gentle heating of the flask, using a Vigreux column. After all the toluene evaporated, the vacuum of an oil pump was applied, and fractions were collected. The fractions and analytical results are shown in the table below:

| Number of Fraction | Boiling Point | Yield, g. | Mol. Wt. Isocyanato Acid Esters found by Isocyanato Titration | Color |
|---|---|---|---|---|
| 1 | 52–55° C./0.15 mm | 13 | 182.3 | Colorless. |
| 2 | 61–65° C./0.2 mm | 10 | 197.2 | Do. |
| 3 | 73–87° C./0.6 mm | 2.5 | 192.3 | Do. |
| 4 | 108–115° C./0.6–1 mm | 10 | 179.4 | Color. |
| 5 | 121–123° C./1–2 mm | 4.5 | 179.2 | Do. |
| Total Yield | | 40 | | |

EXAMPLE 3

10.3 gms of glycine ethylester was dissolved in 50 ml. of carbon tetrachloride. Fifteen grams of phosgene was dissolved in 40 gms. of carbon tetrachloride at about 0° C. and the glycine ester solution added to it. After the addition was finished the mixture was refluxed for several hours. The carbon tetrachloride was distilled off and the residual liquid, carbonyl glycine ethylester, distilled in vacuum.

EXAMPLE 4

17.5 gms of lysine ethylester was dissolved in 100 ml. of benzene. 50 g. of phosgene was added to 200 ml. of benzene below 4° C. and the lycine ethylester solution added. After staying at room temperature for several hours the mixture was refluxed for five hours and then the solvent removed by distillation. The residue was the dicarbonyl lysine ethylester.

EXAMPLE 5

A mixture of amino acids, obtained by acid hydrolysis was suspended in butyl alcohol and anhydrous hydrochloric acid gas passed through the suspension until the butyl alcohol was saturated with hydrochloric acid. The mixture was refluxed for several hours and then the solvent evaporated in vacuum. The residue was suspended in chloroform and ammonia gas passed through the suspension. The ammonium chloride formed in this treatment was removed by filtration, the chloroform solution freed from ammonia and the butylesters of amino acids reacted with phosgene in chloroform solution in the same manner as described in Example 1.

EXAMPLE 6

20 gms. of β-alanine isopropyl ester was dissolved in toluene. 50 gms. of phosgene dissolved in toluene was added and the mixture kept standing overnight. After several hours of refluxing the solvent was distilled in vacuum, the residue was the carbonyl β-alanine isopropyl ester.

While in the foregoing specification various embodiments of this invention have been set forth and specific details thereof elaborated for purpose of illustration, it will be apparent to those skilled in the art that this invention is susceptible to other embodiments and that many of these details may be varied widely without departing from the basic concept and spirit of the invention.

I claim:

1. A process for separating a mixture of amino acids derived from the hydrolysis of a naturally occurring protein comprising esterifying said mixture to obtain a mixture of amino acid esters containing a free basic amino group, contacting the said mixture with phosgene to produce a mixture of isocyanato acid esters having different boiling points, fractionally distilling to separate the resulting mixture into different boiling components, and converting said isocyanato compounds to the corresponding amino acids.

2. A process for separating a mixture of amino acids derived from the hydrolysis of a naturally occurring protein comprising esterifying said mixture to obtain a mixture of amino acid esters containing free basic amino groups, contacting said mixture with phosgene in a mutual solvent inert to said phosgene and esters to provide a mixture containing carbamyl chloride derivatives of said amino acid esters, removing hydrochloride gas from said mixture to produce a mixture of isocyanato acid esters having different boiling points, fractionally distilling to separate the resulting mixture into different boiling components, and converting said isocyanato components to the corresponding amino acids.

3. A process for separating a mixture of amino acids derived from the hydrolysis of naturally occurring proteins comprising esterifying said mixture with ethanol to obtain a mixture of amino acid esters containing free basic amino groups, contacting the said mixture with phosgene in toluene at a temperature below about 20° C., refluxing the mixture to remove hydrochloride gas and thus to produce a mixture of isocyanato acid esters having different boiling points, fractionally distilling to separate the resulting mixture into different boiling components, and converting said isocyanato components to the corresponding amino acids by hydrolysis with hydrochloric acid.

References Cited in the file of this patent
UNITED STATES PATENTS

| | | |
|---|---|---|
| 1,926,756 | Schmidt et al. | Sept. 12, 1933 |
| 2,303,363 | Kaase et al. | Dec. 1, 1942 |
| 2,311,046 | Greenhalgh et al. | Feb. 16, 1943 |
| 2,340,757 | Kaase et al. | Feb. 1, 1944 |
| 2,640,068 | Schaefer et al. | May 26, 1953 |
| 2,644,007 | Irwin | June 30, 1953 |
| 2,680,128 | Slocombe et al. | June 1, 1954 |
| 2,680,129 | Flores | June 1, 1954 |
| 2,689,861 | Thompson | Sept. 21, 1954 |
| 2,733,254 | Allen et al. | Jan. 31, 1956 |